Figure 1:
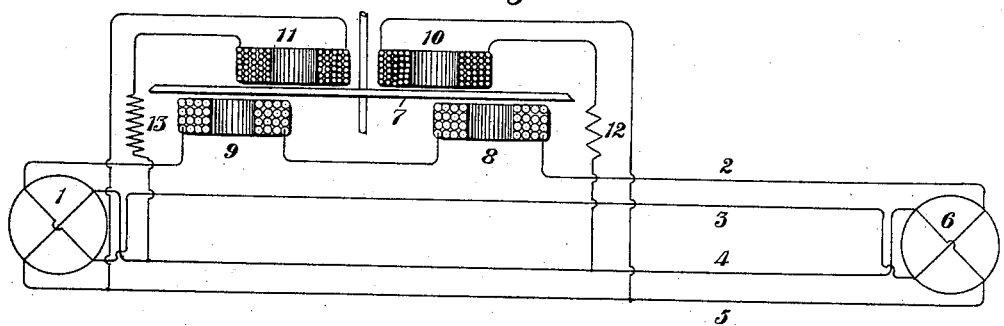

(No Model.)

C. F. SCOTT.
MEANS FOR COMPENSATING FOR TEMPERATURE RESISTANCE CHANGES.

No. 606,033. Patented June 21, 1898.

WITNESSES:
Ethan D. Dodds
Hubert C. Tener

INVENTOR,
Charles F. Scott
BY
Terry, MacKaye & Carr
ATTORNEYS

THE NORRIS PETERS CO., PHOTO-LITHO., WASHINGTON, D. C.

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF SAME PLACE.

MEANS FOR COMPENSATING FOR TEMPERATURE-RESISTANCE CHANGES.

SPECIFICATION forming part of Letters Patent No. 606,033, dated June 21, 1898.

Application filed January 21, 1895. Serial No. 535,666. (No model.)

*To all whom it may concern:*

Be it known that I, CHARLES F. SCOTT, a citizen of the United States, residing at Pittsburg, in the county of Allegheny and State of Pennsylvania, have invented a new and useful Improvement in Means for Compensating for Temperature-Resistance Changes, (Case No. 629,) of which the following is a specification.

My invention relates to electric induction apparatus, and more particularly to electrical indicating and measuring instruments employed in connection with systems of distribution for alternating currents—such, for example, as is shown in the patent granted to O. B. Shallenberger January 1, 1895, No. 531,868; and it has for its object to provide a means whereby variations in the resistance of certain parts of such apparatus due to variations in temperature may be compensated for and the movements of the indicating or registering device be thus caused to indicate or register correctly irrespective of any changes in temperature.

It is well known that the resistance of metallic conductors to the passage of electric currents increases as their temperature rises and that such changes in resistance vary widely in different metals. In certain electrical indicating and measuring instruments—such, for example, as that shown in the patent to O. B. Shallenberger above referred to—it is therefore necessary either to construct the shunt-circuit and the armature of metals having such temperature-resistance coefficients that the changes in resistance due to changes in temperature will be so small as to be practically negligible, or to supply some means for compensating for the changes in resistance due to changes in temperature in order that the amount or degree of movement of the armature may be such as to correctly indicate the energy transmitted over the line.

It is the purpose of my present invention to overcome the difficulty by the method of compensation, and to this end I propose to so construct the shunt-circuit that its action upon the armature will increase with the rise in temperature in the same degree that the conductivity of the armature decreases. For the purpose of effecting this result I propose to employ two shunt-circuits having different resistance values and different temperature-resistance coefficients and to so place them with reference to the armature that they will act differentially upon it.

Figure 2:
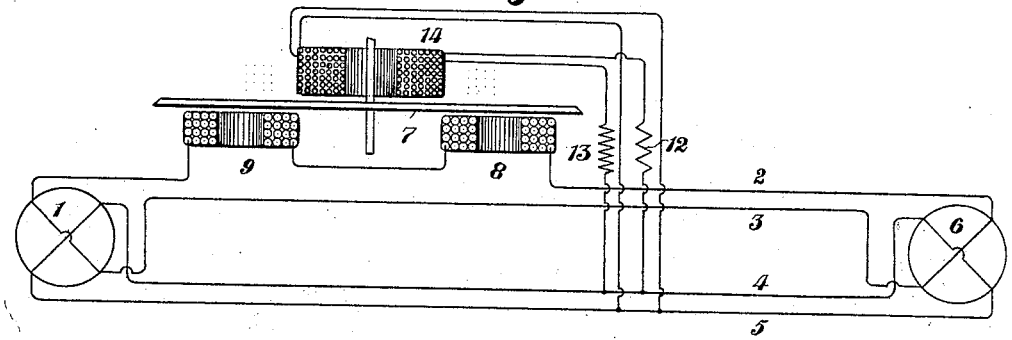

Referring to the drawings, Figure 1 is a diagram illustrative of my invention as applied to a two-phase system of distribution and an indicating-wattmeter therefor. Fig. 2 is a similar view showing a modified arrangement of circuits.

Referring now in detail to Fig. 1 of the drawings, 1 is a two-phase generator, and 2, 3, 4, and 5 the circuits leading therefrom to suitable translating means—such, for example, as a two-phase motor 6.

7 is the disk-armature, and 8 and 9 the series-connected coils, these parts being in all respects like those in the patent to Shallenberger hereinbefore referred to. In lieu of the shunt-connected coil shown in the said patent I employ two such coils 10 and 11, separately connected in shunt upon circuit 4 5, these coils being so placed with reference to the armature 7 as to act differentially thereon. In series with one of these coils—as, for example, the coil 10—I place a non-inductive resistance 12, constructed of metal having a relatively low temperature-resistance coefficient—such, for instance, as German silver—and in series with the coil 11 I place a non-inductive resistance 13 of greater value than the resistance 12 and constructed of a material having a relatively high temperature-resistance coefficient—such, for instance, as copper.

The metals above named are merely given as examples of suitable metals to be employed, and I do not wish it to be understood that my invention is restricted to any particular conducting materials, it being essential merely that the two resistances should have different degrees of conductivity at the same temperature, whatever that may be, and that the temperature-resistance coefficients of the two shall be different.

The modification of my invention illustrated in Fig. 2 of the drawings differs from that shown in Fig. 1 only in the relative arrangement of the shunt-connected circuits. In this modification, instead of providing two separate coils so located as to act differentially upon the disk, I wind the two conductors together into a single coil 14, and thus get the desired differential action.

In order that the operation of my invention may be clearly understood, let us suppose that the resistance 12, of German silver, has a value of one hundred and the resistance 13, of copper, a value of two hundred, and that the temperature-resistance coefficient of the former is such that for a certain change in temperature the increase of resistance is one per cent., and that for the same change in temperature the increase of resistance in the latter is ten per cent. It follows, therefore, that the resistances at the said higher temperature will have values of one hundred and one and two hundred and twenty, respectively, and that the currents through the shunt-circuits will be reduced one per cent. and ten per cent., respectively. If we represent the current in the first circuit at the first temperature as one and in the second circuits as .50, at the same temperature, it follows that at the higher temperature the currents will be approximately .99 and .45 in the respective circuits. If now the currents in the two circuits be made to act differentially upon the armature as indicated, the resultant effect will be one minus .50, or .50 at the first temperature, and .99 minus .45, or .54 at the higher temperature, or an increase in the resultant action upon the armature of .04 at the higher temperature over that at the lower. It will thus be seen that the resistances may be so proportioned and the materials employed therefor be so selected that the increased resultant effect of the shunt-connected circuits upon the armature may be made to exactly compensate for the loss in conductivity in the latter by reason of such increase in temperature.

The proportions used in the above illustration will give very fair compensation if the disk 7 be of aluminium.

While I have illustrated and described my invention as applicable to and primarily intended for use in connection with electrical indicating and measuring instruments, I desire it to be distinctly understood that it is applicable to any and all forms of electrical apparatus in which a compensation for changes in resistance due to changes in temperature is necessary or desirable.

I claim as my invention—

1. In an indicating instrument for alternating currents, the combination with the rotatable closed-circuit armature of two actuating-circuits in inductive relation to said armature and containing non-inductive resistances, one of which has a greater value and a higher temperature-resistance coefficient than the other, substantially as described.

2. The combination with a movable armature, of shunt and series connected circuits in inductive relation thereto and non-inductive resistances of different values in the respective shunt-circuits and one of which has a different temperature-resistance coefficient from the other.

3. The combination with a movable armature, of series and shunt connected actuating-coils therefor and a non-inductive resistance in series with each of said shunt-connected coils one of which has a greater temperature-resistance coefficient than the other, substantially as described.

4. In an electrical indicating or measuring instrument, a movable armature, series-connected coils upon one side of said armature, and shunt-connected coils upon the other side thereof, a resistance having a relatively small temperature-resistance coefficient in series with one of the shunt-coils and a greater resistance having a relatively large temperature-resistance coefficient in series with the other shunt-coil, substantially as described.

In testimony whereof I have hereunto subscribed my name this 18th day of January, A. D. 1895.

CHAS. F. SCOTT.

Witnesses:
CHARLES IRA YOUNG,
J. WILLIAM SMITH.